United States Patent [19]

Anderson et al.

[11] 3,772,793

[45] Nov. 20, 1973

[54] HEAVY FABRIC CUTTING TOOL GUIDE

[76] Inventors: Lloyd E. Anderson, 3123 Upton Ave., North Minneapolis, Minn. 55412; Donlin Thompson, 8332–11th Ave., South Minneapolis, Minn. 55420; Gilbert L. Alinder, 5312 Shoreview Ave., South Minneapolis, Minn. 55417

[22] Filed: Oct. 7, 1971

[21] Appl. No.: 187,528

Related U.S. Application Data

[63] Continuation of Ser. No. 35,508, May 7, 1970, abandoned.

[52] U.S. Cl. .................................. 33/174 G, 30/289
[51] Int. Cl. ........................... B43l 7/00, D06h 7/00
[58] Field of Search ...................... 33/174 B, 174 G; 269/87.2, 295; 30/286, 287, 289, 290; 83/614, 454, 455

[56] References Cited
UNITED STATES PATENTS
2,041,240  5/1936  Gluesing ............................. 269/295
760,618  5/1904  Farmer ............................... 269/87.2

FOREIGN PATENTS OR APPLICATIONS
129,978  10/1932  Austria ................................. 83/614

*Primary Examiner*—Louis R. Prince
*Assistant Examiner*—Charles E. Phillips
*Attorney*—Schroeder, Siegfried & Ryan

[57] ABSTRACT

A readily portable heavy fabric cutting tool guide is provided to aid in the cutting of heavy fabric such as rugs. The guide utilizes a substantially rigid unitary elongated tube-like member having a slot opening along the longitudinal axis thereof. Stabilizing means are provided to hold the slot in an upright position during usage. In a preferred form, two or more members are utilized which telescope into one another to provide a guide of adjustable length.

5 Claims, 4 Drawing Figures

PATENTED NOV 20 1973

3,772,793

INVENTORS
GILBERT L. ALINDER
LLOYD E. ANDERSON
DONLIN THOMPSON

Schroeder, Siegfried & Ryan
ATTORNEYS

HEAVY FABRIC CUTTING TOOL GUIDE

This is a continuation of application Ser. No. 35,508 filed May 7, 1970, now abandoned.

BREIF DESCRIPTION OF THE INVENTION

Our invention is directed to a cutting tool guide to be used in the cutting of heavy fabrics such as rugs. It will also prove of value in cutting of other materials such as linoleum. More specifically, our invention is directed to such a tool which is readily portable and which can be positioned under the fabric to provide a wide variety of straight cuts. This latter feature is highly desirable when installing carpeting in a house or office in a room of irregular shape. The cutting guide tool of our invention has, in addition to the simplicity of its use, a construction such as to provide inexpensive fabrication and ready storage of the cutting guide tool when not in use.

Figure 1:
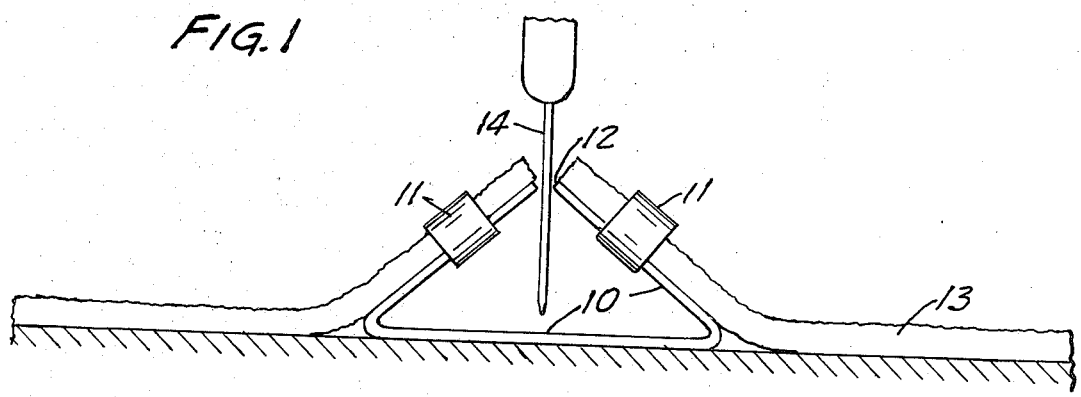
FIG. 1 is an end elevational view of one form of the cutting tool in accordance with the invention.

Referring first to FIG. 1, there is shown in end elevational view a cutting tool guide 10 which may be fashioned from a unitary sheet of material which possesses adequate strength and rigidity for the purpose. Metal is the preferred material, although other materials may be used. A cold rolled steel of 1/16-inch thickness is sufficiently thick to give the desired strength and is hard enough to give good wear.

Member 10 has been formed into a generally triangular tube so as to leave an opening 12 at the apex between the legs of the triangular tube of member 10. Opening 12 is a slot running longitudinally along the axis of member 10. The base of the triangle opposite slot 12 is broad compared to the altitude of the triangle so as to provide stability against turning. The altitude should be sufficient to permit movement of the cutting tool within the tube. The overall size should not be so large that the unit becomes excessively heavy or interferes with ready draping of the material to be cut thereover. We have found that a triangle having a base of about 2½ inches and an altitude of 1¼ inches provides the desired relationship.

A rug or other heavy fabric material 13 has been draped over and across the upper surface of member 10 so as to present the surface to be cut in alignment with slot 12. Holding members such as clips 11 may be utilized to hold the fabric 13 in position during a cutting operation by some cutting means such as a knife blade 14. Clip members 11 may be permanently mounted to member 10 by means of rivets or the like, or they may be members which can either be slipped on and off or detachably held by means such as screws to provide greater versatility in the handling of varying thickness materials. For example, if material 13 is relatively thick, it may be desirable to change to clips with a wider opening than would be the case if the material were somewhat thinner.

Figure 1A:
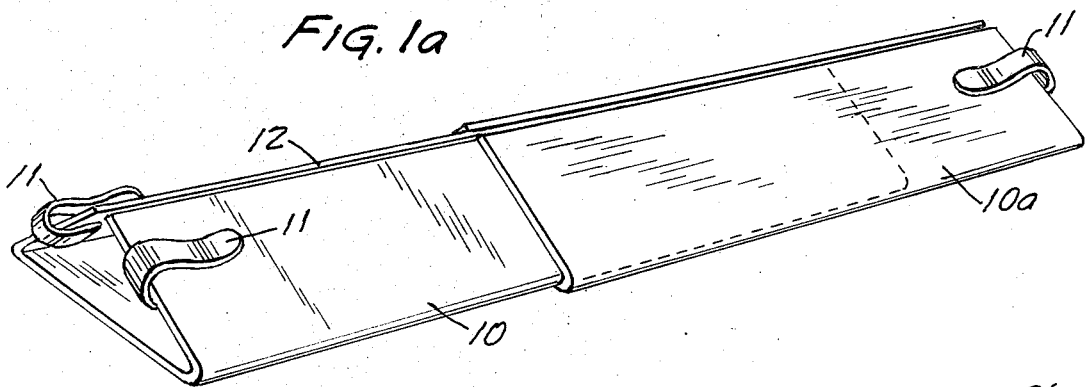
FIG. 1a is a perspective view of a cutting tool guide in accordance with FIG. 1, showing a telescoping arrangement.

Referring more specifically to FIG. 1a, there is shown in perspective view a device in accordance with FIG. 1. The heavy fabric member 13 is not shown. As can be seen in FIG. 1a, a second longitudinal member 10a, which is of slightly larger size, is telescoped over the end of member 10. The overlap is shown in phantom. As can be readily appreciated, the telescoping construction permits one to have members which are individually short enough to provide ready storage, and yet may be combined and extended to handle a large number of different sizes of fabrics. If clip members 11 are permanently or semi-permanently mounted to members 10 and 10a, then it can be readily understood that the members 10 and 10a are slidably moved under the fabric material 13 until clip members 11 engage the fabric and hold the fabric in the desired position during cutting.

While FIG. 1a shows only two members telescoping into one another, it should be appreciated that multiple numbers of telescoping members may be used. That is, one can now readily envision alternate members 10 and 10a repeating to provide any length as desired. Many fabrics, and in particular rugs, may be of considerable length. It is desirable to be able to accomplish straight cutting of such fabrics as long as 15 feet or more. In such instances, it may be desirable to have more than one telescoping member with the assembly.

Figure 2:
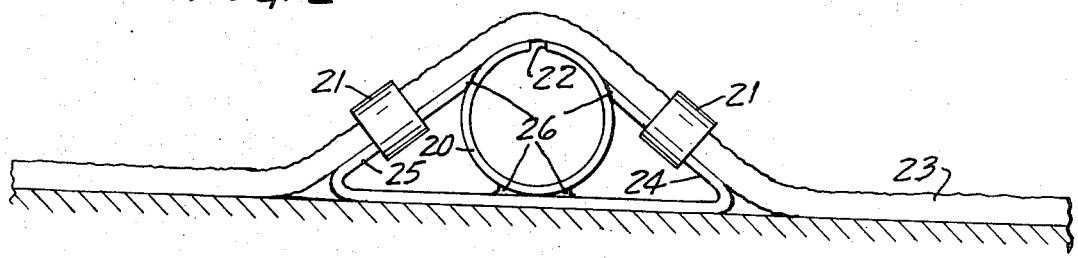
FIG. 2 is an end elevational view of a preferred form of the invention utilizing a cylindrical member having a slot along the upper edge thereof.

Referring now to FIG. 2, there is illustrated in end elevational view a preferred form of the invention, wherein a cylinder member 20 of about 1¼ inches O.D. has been provided with a slot 22 running the longitudinal length thereof. The function of slot 22 is essentially the same as that of slot 12 discussed with regard to FIGS. 1 and 1a. Stabilizing members 24 and 25 are provided to maintain slot 22 in a substantially uppermost position of the assembly. Members 24 and 25 may be separate units, or they may be a single unit, as is shown in the figure. As is more clearly shown in FIG. 2a, the members 24 and 25 do not extend the entire length of cylindrical member 20, but rather merely extend far enough to provide stability against rotation of member 20. Stabilizing members 24 and 25 are fixedly joined to cylinder 20 by means such as welds or solder joints 26. The precise characteristics of the stabilizing members are not critical, although it is desirable that the angle formed between the arms of members 24 or 25 and the cylinder be generally tangential to the surface thereof. In any event, the stabilizing member should extend from the side walls of the cylinder for a distance sufficient to meet the tangent line of the lower surface of cylinder 20. This will be a base of about twice the length of the diameter of the cylinder. This construction will restrict the tendency of the cylinder to rotate during use.

A consideration of the view of our invention shown in FIG. 1 and FIG. 2 will show the reason the form of FIG. 2 is preferred. Assuming equal thickness for units 10 and 20, it will be readily understood that considerably less material is used in the guide of FIG. 2 than for that of FIG. 1. This is important when maximum portability—i.e., low weight—is desired. Also, as curved surfaces are more resistant to bending, one may use thinner gauge metals for the cylindrical form than for forms such as FIG. 1, resulting in additional savings of cost and weight.

Figure 2A:
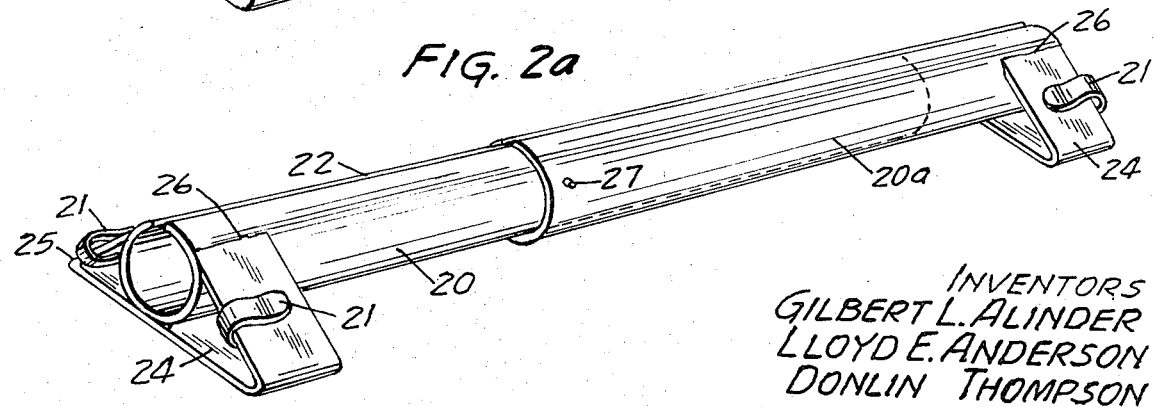
FIG. 2a is a perspective view of a cutting tool in accordance with FIG. 2 showing a telescoping member.

Referring specifically to FIG. 2a, there is shown in perspective view the cylinder member 20 having the stabilizing means 24 and 25 provided to prevent rotation thereof. Clip members 21 are provided, and shown attached to the legs of stabilizing members 24 and 25, the clips serving essentially the same function as clip members 11 discussed with regard to FIGS. 1 and 1a. Cylinder member 20a is shown as telescoping around cylinder member 20 to provide the same extension capabilities as was discussed with regard to the configuration shown in FIG. 1a. As a means of holding the telescoping members in position, a set screw 27 is shown for locking the telescoping members in some predetermined relationship.

The stabilizing members 24 and 25 of FIG. 2a have been shown at the extremities of the members. When multiple numbers of telescoping members are to be used, it may not prove necessary to have stabilizing means for the intermediate units. For longer lengths, it will be desirable to have the more central telescoping members have a stabilizer located in an intermediate point between the ends of the member. In this relationship, the stabilizing members 24 and 25 will not interfere with the overall length adjustment.

While our invention has been described with readily portable arrangements, it should be understood that these forms may readily be mounted in permanent or semi-permanent manner to tables, frames or the like when desired.

We claim:

1. A readily portable heavy fabric cutting tool guide comprising:
    a. first and second substantially rigid unitary thin walled elongated tube-like members, said tube members joined at a first end of each member in telescoping relationship with one another, each of said members having a narrow slot opening along the longitudinal axis thereof of sufficient width to permit passage of a cutting tool therethrough, said tube-like members having an inner spacing between said opening and the opposing inner walls of at least one inch; and,
    b. stabilizing means adjacent the opposite ends of each of said tubes for maintaining said slots in slignment with one another and in an upwardly oriented position.

2. A readily portable heavy fabric cutting tool guide comprising:
    a. first and second substantially rigid unitary thin walled cylindrical tube members, said tube members joined at a first end of each member in telescoping relationship with one another, each of said members having a narrow slot opening along the longitudinal axis thereof of sufficient width to permit passage of a cutting tool therethrough, and having an internal diameter in excess of one inch, and,
    b. stabilizing means adjacent the opposite ends of each of said tubes for maintaining said slots in alignment with each other and in an upwardly oriented position.

3. A guide in accordance with claim 1 wherein means are provided at each end of said guide for mechanically holding the heavy fabric during cutting.

4. A guide in accordance with claim 1 wherein the stabilizing means are leg-like members extending outwardly from each side of the end portions of each of said cylindrical tube members for a distance at least to meet a tangent line across the lower side of said cylinders.

5. A guide in accordance with claim 4 wherein the width of the base defined by outer ends of said leg members is about twice the diameter of said cylinder.

* * * * *